Figure 1:
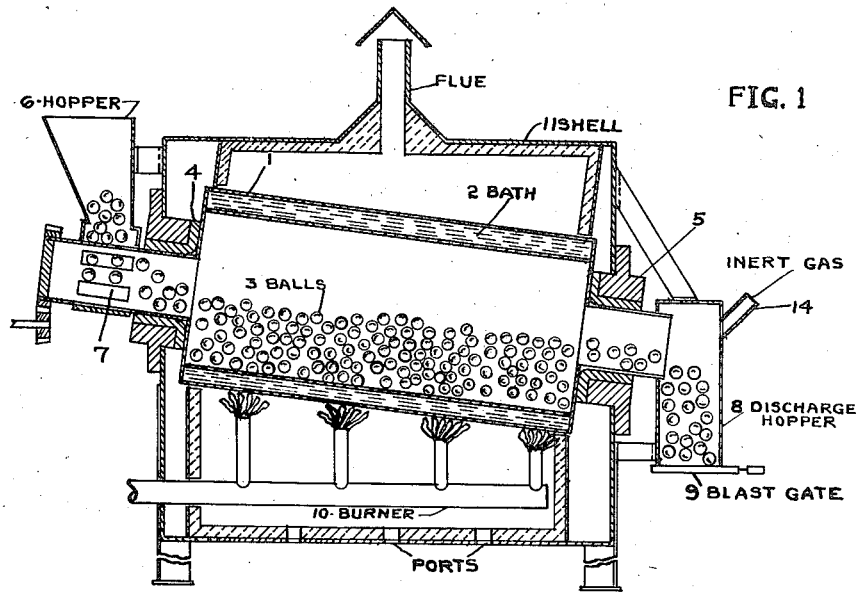

Nov. 12, 1935.  A. O. JAEGER  2,020,505

PRODUCTION OF MONOCARBOXYLIC ACIDS AND THEIR DERIVATIVES

Filed July 26, 1930

INVENTOR
ALPHONS O. JAEGER.

BY *Robert Ames Norton*

ATTORNEY

Patented Nov. 12, 1935

2,020,505

UNITED STATES PATENT OFFICE 2,020,505

PRODUCTION OF MONOCARBOXYLIC ACIDS AND THEIR DERIVATIVES

Alphons O. Jaeger, Mount Lebanon, Pa., assignor, by mesne assignments, to American Cyanamid & Chemical Corporation, a corporation of Delaware Application July 26, 1930, Serial No. 470,832

16 Claims. (Cl. 260—108)

This invention relates to the production of monocarboxylic acids from polycarboxylic acids, and more specifically to the production of benzoic acid from phthalic acid.

In the past benzoic acid has been prepared from phthalic acid by passing a mixture of calcium phthalate and calcium hydroxide with a diluent such as calcium carbonate through narrow heated tubes. This procedure is described in the patent to Fairweather, Beckett, and Thomas No. 1,727,102 dated September 3, 1929. This process has proved to be of little value practically since the difficulties of slowly conveying the material through narrow heated tubes are practically insuperable. At the high temperature at which the reaction takes place there is a serious tendency for the material to agglomerate and form a thin coating on the inside of the tube, resulting in much spoiled material and so decreasing the heat conduction as to make the process practically worthless.

Contrary to the teaching of the prior art I have found that better results are obtained if the reacting materials are passed through a heated rotary kiln in contact with the balls, preferably of high heat conductivity. A remarkably even temperature control is obtained and the tumbling of the balls effects a very intimate mixture of the reacting ingredients and prevents any danger of caking which renders the methods of the prior art commercially impracticable.

The invention is not limited to any particular design of rotary kiln, any suitable type being usable. The drawing shows two representative modifications, but the invention is in no sense limited to the particular design shown in the drawing. The kilns may be inclined or horizontal and the balls may be introduced and discharged with the reaction mixture or they may be retained in the kiln by suitable screens dividing the kiln into compartments and permitting the powdered reacting ingredients to pass through while retaining the balls. The balls may be of any suitable material but preferably are material of high heat conductivity, such as metals, so that a very uniform distribution of heat is made possible. Ordinary or high chrome steel balls or balls of other metal alloys may be used. Porcelain balls are also suitable though somewhat less desirable because of their lower heat conductivity.

By reason of the extremely intimate mixing produced by the tumbling of the balls in the kiln it is possible to directly heat the walls of the kiln, especially where balls of high heat conductivity are used, and this is included within the broad scope of the present invention. However, even with the remarkable temperature control achieved by the balls, it is usually desirable to surround the rotating kiln with a suitable jacket filled with a bath material, such as a molten metal bath, in order to obtain a still better temperature control. This modification constitutes the preferred modification of the present invention. Heating may be imparted either by direct fire under the kiln or by any other means for heating the bath or, in the modification where the balls are charged and discharged with the reaction material, it is possible to preheat the balls before charging and rely on their heat to bring the reaction mixture up to reaction temperature. This method however requires a very accurate feed of balls and is somewhat more complicated and therefore less suitable for large scale installations, but is included in the scope of the invention.

The invention may be used as a pure batch process, that is to say, the batch may be charged into the kiln and maintained there until reaction is completed but preferably the process is arranged to be continuous as by this means a larger production from a given unit and lower labor costs are possible and the continuous process may therefore be considered as a preferred procedure.

The invention is not only applicable to the production of benzoic acid, or rather benzoates, from phthalic acid salts, but is generally applicable to the production of other monocarboxylic acid compounds from polycarboxylic acid compounds, for example, the production of naphthoic acid from naphthalic acid, propionic acid from succinic acid, etc.

The temperatures used in general fall within the same range as those employed in the narrow heated compartments of the prior art, and the present invention is not limited to any particular new temperature or temperature range. At the high temperatures used, it is usually desirable to provide for a protecting atmosphere during reaction since of course the material is open to whatever atmosphere is present, in contradistinction to the narrow tubes of the prior art where the tube is normally operated full. Any suitable protecting atmosphere may be used such as an inert gas, for example, nitrogen, or, if desired, a reducing atmosphere may be used such as hydrogen, hydrocarbon vapors and the like, and steam may also be used. When hydrogen is used, particularly with salts of the polycarboxylic acid and reducing metals such as copper, nickel, zinc, and the like, acids or aldehydes may be obtained according to the conditions chosen. The production of aldehydes or acids by carrying out the process in a reducing atmosphere is not claimed per se in the present application, this being the subject matter of my co-pending application Serial No. 359,722 filed May 1, 1929, now Patent No. 1,961,150, dated June 5, 1934.

Figure 2:
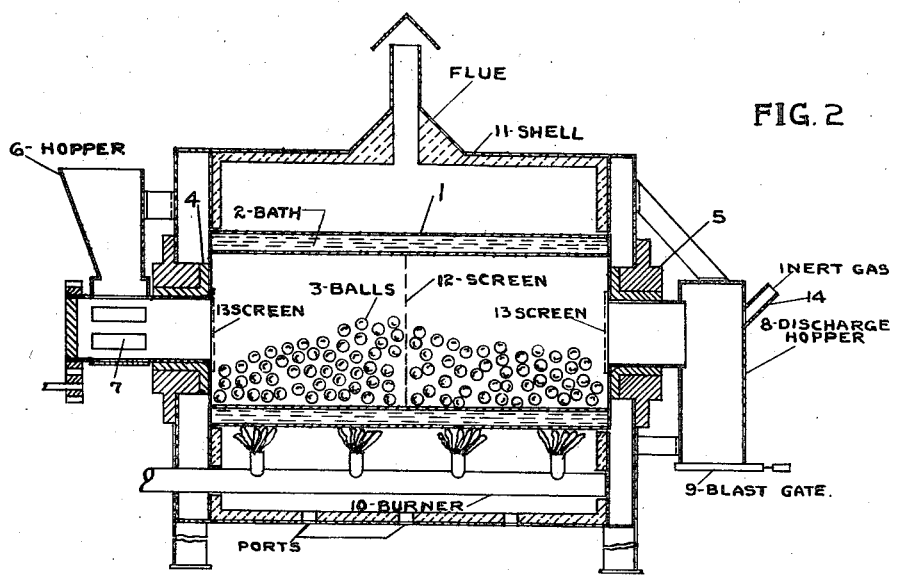

The invention will be described in greater detail in connection with the drawing, in which Fig. 1 is a vertical section through an inclined kiln showing discharge of balls with reacting material; and Fig. 2 is a vertical section through a horizontal kiln in which the balls are permanently retained in screened compartments.

The modification shown in Fig. 1 consists of a rotating kiln 1, provided with a jacket containing a bath 2, rotating in the bearings 4 and 5 at a slight inclination. One end of the drum extends under charging hopper 6 and is provided with suitable charging slots 7 which successively register with an opening in the bottom of the hopper 6 as the kiln rotates. The discharge end extends into a receiver 8 from which material can be periodically removed by means of the blast gate 9. An atmosphere of inert gas may be provided by introduction through the valved pipe 14. The kiln is heated by burner 10 and is surrounded with a shell 11, provided with a suitable flue for the escape of the products of combustion.

In operation the bath space in the kiln is filled almost full with a lead bath. The burners are lit and when the bath has reached a temperature between 420° and 450° C. a powdered mixture containing calcium phthalate, calcium hydroxide and calcium carbonate in the proportion of 2 mols calcium phthalate, 1.2 mols calcium hydroxide and a weight of calcium carbonate equal to two-thirds the combined weight of calcium phthalate and calcium hydroxide is mixed with mild steel balls and fed into the hopper 6, passing through the slot 7 into the kiln and gradually passing therethrough into the receiver 8. The rotation of the kiln determines the feed of material and should be so adjusted as to give a period of heating from 30 to 200 minutes. With 30 minutes heating in a bath temperature of 437° C. yields of from 85 to 92% are obtained, the remainder consisting in about equal parts of unreacted calcium phthalate and waste material such as benzol, charred material, and the like. An atmosphere of a suitable inert gas, such as nitrogen, or a protecting gas, such as hydrogen, should be introduced through the valve pipe 14 and maintained during the heating.

It will be noted that the molecular proportion of calcium hydroxide to calcium phthalate is 1.2:2 instead of 1:2 as described in the prior art and as called for by the theoretical reaction. The amount of calcium carbonate is also about two-thirds of that used in the prior art. The reason for using an excess of calcium hydroxide is due to the fact that some of the decomposition of the calcium phthalate results in the production of additional carbon dioxide, as, for example, when some of it is cracked to benzol or completely burned to carbon dioxide and water in case traces of oxygen are present. This additional carbon dioxide unites with some of the calcium hydroxide and makes an excess desirable for best results. The process of the present invention can, of course, be carried out with the proportions called for by the prior art but the yields are not quite as good although still better than when the narrow heated tubes are used.

It should be noted that an excess of lime is not claimed per se in the present invention, this constituting the subject matter of my co-pending application Serial No. 471,594, filed July 29, 1930, now Patent No. 1,885,834, dated Nov. 1, 1932. This improvement of process is covered in the present application only in connection with the use of a rotary ball kiln, which forms the subject matter of the present invention.

In a similar manner calcium naphthalate or calcium succinate can be transformed into the corresponding salts of the monocarboxylic acids.

If desired the kiln may be charged with a batch and after heating the batch discharged by any suitable means. The batch method however is less desirable as it cuts down the capacity of the unit and increases the labor required.

Fig. 2 shows a modification of a rotary kiln, like parts bearing the same numerals. In this modification end screens 13 and a central screen 12 are provided, dividing the kiln into two compartments. Balls are introduced into these two compartments to the desired depth and the screens placed in position. The kiln is then operated precisely as is the kiln in Fig. 1 except that no balls are introduced with the reaction mixture. The reaction mixture passes through the kiln as it is much finer than the mesh of the screens, but the balls are retained in their respective compartments, thus making it unnecessary to separate the hot balls discharged with the reacting material as in the modification shown in Fig. 1. On the other hand, however, of course, it is not possible to use preheated balls as a heating means. Since the balls are maintained continuously in the compartments of the kiln it is preferable to use balls which show no tendency to corrosion at high temperatures and for this purpose high chrome steel, such as "Allegheny metal", may be used for the balls.

The modification shown in Fig. 2 may of course be used in a batch process and if desired the kiln may be inclined as shown in Fig. 1. The operation is of course the same except the balls are not discharged. In practice it is sometimes desirable to divide the kiln into a still larger number of compartments, especially when it is inclined and the use of two compartments only as shown in the drawing is not intended to limit the invention, but is merely illustrative of one modification.

What is claimed as new is:

1. A method of transforming a salt of a polycarboxylic acid to that of the corresponding monocarboxylic acid, which comprises subjecting a mixture containing the salt of the polycarboxylic acid and a strong inorganic base to reaction temperatures in a rotary kiln at least partially filled with balls of relatively heavy, heat conductive material.

2. A method of transforming a salt of a polycarboxylic acid to that of the corresponding monocarboxylic acid, which comprises subjecting a mixture containing the salt of the polycarboxylic acid and a strong inorganic base to reaction temperatures in a rotary kiln at least partially filled with metal balls.

3. A method of transforming a salt of a polycarboxylic acid to that of the corresponding monocarboxylic acid, which comprises subjecting a mixture containing the salt of the polycarboxylic acid and a strong inorganic base and an inert diluent to reaction temperatures in a rotary kiln at least partially filled with balls of relatively heavy, heat conductive material.

4. A method of transforming a salt of a polycarboxylic acid to that of the corresponding monocarboxylic acid, which comprises subjecting a mixture containing the salt of the polycarboxylic acid and a strong inorganic base and an inert diluent to reaction temperatures in a rotary kiln at least partially filled with metal balls.

5. A method of transforming a phthalate of a metal to a benzoate, which comprises subjecting a mixture containing the phthalate and a strong inorganic base to reaction temperatures in a rotary kiln at least partially filled with balls of relatively heavy, heat conductive material.

6. A method of transforming a phthalate of a metal to a benzoate, which comprises subjecting a mixture containing the phthalate and a strong inorganic base to reaction temperatures in a rotary kiln partially filled with metal balls.

7. A method of transforming a phthalate of a metal to a benzoate, which comprises subjecting a mixture containing the phthalate and a strong inorganic base and an inert diluent to reaction temperatures in a rotary kiln partially filled with balls of relatively heavy, heat conductive material.

8. A method of transforming a phthalate of a metal to a benzoate, which comprises subjecting a mixture containing the phthalate and a strong inorganic base and an inert diluent to reaction temperatures in a rotary kiln partially filled with metal balls.

9. A method of transforming a phthalate to a benzoate, which comprises subjecting a mixture containing an alkaline earth metal phthalate and an alkaline earth metal hydroxide to reaction temperatures in a rotary kiln partially filled with balls of relatively heavy, heat conductive material.

10. A method of transforming a phthalate to a benzoate, which comprises subjecting a mixture containing an alkaline earth metal phthalate and an alkaline earth metal hydroxide to reaction temperatures in a rotary kiln partially filled with metal balls.

11. A method of transforming a phthalate to a benzoate, which comprises subjecting a mixture containing an alkaline earth metal phthalate, an alkaline earth metal hydroxide and an inert diluent to reaction temperatures in a rotary kiln partially filled with balls of relatively heavy, heat conductive material.

12. A method of transforming a phthalate to a benzoate, which comprises subjecting a mixture containing an alkaline earth metal phthalate, an alkaline earth metal hydroxide and an inert diluent to reaction temperatures in a rotary kiln partially filled with metal balls.

13. A method according to claim 1, in which the reaction mixture is continuously fed into one end of the rotating kiln and is continuously discharged at the other end.

14. A method according to claim 3, in which the reaction mixture is continuously fed into one end of the rotating kiln and is continuously discharged at the other end.

15. A method according to claim 5, in which the reaction mixture is continuously fed into one end of the rotating kiln and is continuously discharged at the other end.

16. A method according to claim 7, in which the reaction mixture is continuously fed into one end of the rotating kiln and is continuously discharged at the other end.

ALPHONS O. JAEGER.